United States Patent
Lan et al.

(10) Patent No.: US 9,882,975 B2
(45) Date of Patent: *Jan. 30, 2018

(54) METHOD AND APPARATUS FOR BUFFERING AND OBTAINING RESOURCES, RESOURCE BUFFERING SYSTEM

(71) Applicant: Huawei Digital Technologies(Cheng Du) Co., Limited, Chengdu (CN)

(72) Inventors: Gang Lan, Chengdu (CN); Rui Wang, Chengdu (CN); Chen Gong, Shenzhen (CN); Shuguo Zhou, Chengdu (CN)

(73) Assignee: Huawei Digital Technologies (Cheng Du) Co., Limited, Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/204,816

(22) Filed: Jul. 7, 2016

(65) Prior Publication Data

US 2016/0323369 A1 Nov. 3, 2016

Related U.S. Application Data

(63) Continuation of application No. 13/446,777, filed on Apr. 13, 2012, now Pat. No. 9,503,518, which is a
(Continued)

(30) Foreign Application Priority Data

Oct. 13, 2009 (CN) .......................... 2009 1 0207231

(51) Int. Cl.
*G06F 15/16* (2006.01)
*H04L 29/08* (2006.01)

(52) U.S. Cl.
CPC ...... *H04L 67/1029* (2013.01); *H04L 67/1002* (2013.01); *H04L 67/1012* (2013.01); *H04L 67/1023* (2013.01); *H04L 67/2852* (2013.01)

(58) Field of Classification Search
USPC ........................................................ 709/217
See application file for complete search history.

(56) References Cited

U.S. PATENT DOCUMENTS

| | | | | |
|---|---|---|---|---|
| 6,088,721 | A * | 7/2000 | Lin | .......................... H04L 67/06 709/213 |
| 6,438,652 | B1 * | 8/2002 | Jordan | .................... G06F 9/505 709/219 |

(Continued)

FOREIGN PATENT DOCUMENTS

| CN | 1322315 A | 11/2001 |
|---|---|---|
| CN | 1386323 A | 12/2002 |

(Continued)

OTHER PUBLICATIONS

Communication in corresponding European Patent Application No. 07846070.6 (dated Apr. 9, 2010).

(Continued)

*Primary Examiner* — Alicia Baturay
(74) *Attorney, Agent, or Firm* — Leydig, Voit & Mayer, Ltd.

(57) ABSTRACT

A method and an apparatus for buffering and obtaining resources as well as a resource buffering system are disclosed. The method includes: obtaining an access popularity value of a resource from a database at intervals of a first preset time, and obtaining load values of cache servers from the database if determining that the access popularity value reaches a preset first threshold; and determining a duplication cache server for duplicating the resource according to the access popularity value and the load values, and notifying the duplication cache server to duplicate the resource from a cache server that stores the resource and buffer the resource. The method overcome the problems in the prior art, namely, the same resource is buffered in only one cache server and the relatively idle cache servers are unable to (Continued)

share loads with busy cache servers. The method improves extensibility and working efficiency of the buffering system.

9 Claims, 10 Drawing Sheets

Related U.S. Application Data continuation of application No. PCT/CN2010/077639, filed on Oct. 11, 2010.

(56) References Cited

U.S. PATENT DOCUMENTS

| | | | |
|---|---|---|---|
| 7,237,108 B2* | 6/2007 | Medvinsky | G06F 21/10 380/200 |
| 7,243,366 B2* | 7/2007 | Medvinsky | G06Q 20/367 705/65 |
| 7,254,636 B1* | 8/2007 | O'Toole, Jr. | G06F 17/30067 707/999.008 |
| 7,350,046 B2* | 3/2008 | Sicola | G06F 11/0727 711/111 |
| 8,255,989 B2* | 8/2012 | Medvinsky | G06F 21/10 382/115 |
| 8,417,816 B2* | 4/2013 | Esteban | G06F 17/30017 709/201 |
| 9,503,518 B2* | 11/2016 | Lan; Gang | H04L 67/1029 |
| 2002/0026560 A1 | 2/2002 | Jordan et al. | |
| 2003/0059053 A1* | 3/2003 | Medvinsky | G06F 21/10 380/277 |
| 2003/0063750 A1* | 4/2003 | Medvinsky | G06F 21/10 380/277 |
| 2007/0136469 A1 | 6/2007 | Nusbickel | |
| 2007/0220220 A1 | 9/2007 | Ziv et al. | |

FOREIGN PATENT DOCUMENTS

| | | |
|---|---|---|
| CN | 1489069 A | 4/2004 |
| CN | 1499734 A | 5/2004 |
| CN | 1552132 A | 12/2004 |
| CN | 1689072 A | 10/2005 |
| CN | 1863099 A | 11/2006 |
| CN | 101018213 A | 8/2007 |
| CN | 101322385 A | 12/2008 |
| CN | 101668046 A | 3/2010 |

OTHER PUBLICATIONS

International Search Report in corresponding PCT Patent Application No. PCT Patent Application No. PCT/CN2007/071239 (dated Mar. 27, 2008).
International Search Report in corresponding PCT Patent Application No. PCT/CN2007/071175 (dated Mar. 20, 2008).
1st Office Action in corresponding Chinese Application No. 200610168031.3 (dated Jul. 12, 2010).
2nd Office Action in corresponding Chinese Application No. 200610168031.3 (dated Mar. 30, 2011).
1st Office Action in corresponding Chinese Application No. 200610162179.6 (dated Jun. 10, 2010).
1st Office Action in corresponding Chinese Application No. 200610164436.X (dated Nov. 27, 2009).
Li et al., "Noise Reduction Using a Variable Step Size Adaptive Filter," Optoelectronic Technology & Information, vol. 17, No. 5, Oct. 2004.
Office Action in corresponding Chinese Patent Application No. 200910207237.9 (dated Feb. 28, 2012).
Written Opinion of the International Searching Authority in corresponding International Patent Application No. PCT/CN2010/077639 (dated Jan. 20, 2011).

* cited by examiner

METHOD AND APPARATUS FOR BUFFERING AND OBTAINING RESOURCES, RESOURCE BUFFERING SYSTEM

CROSS-REFERENCE TO RELATED APPLICATION

This application is a continuation of U.S. patent application Ser. No. 13/446,777, filed on Apr. 13, 2012, which is a continuation of International Application No. PCT/CN2010/077639, filed on Oct. 11, 2010, which claims priority to Chinese Patent Application No. 200910207231.9, filed on Oct. 13, 2009, all of which are hereby incorporated by reference in their entireties.

FIELD OF THE DISCLOSURE

The present disclosure relates to storage technologies, and in particular, to a method and apparatus for buffering and obtaining resources, and a resource buffering system.

BACKGROUND OF THE DISCLOSURE

In the resource buffering technologies at present, a scheduling server in a resource buffering system judges whether the number of times of accessing a resource reaches a preset threshold according to the access popularity of the resource in order to relieve egress bandwidth pressure. After the access popularity of the resource reaches the preset popularity threshold, the scheduling server schedules a cache server according to a scheduling algorithm to download resources that need to be buffered. After the download is complete, the cache server notifies the database of the scheduling server that the resource has been buffered on a cache server. In practice, only one cache server in the system is available for providing the buffering service.

If a user needs to download the resource, the system checks whether the resource is buffered in the system. If the resource is buffered, the system checks information about the cache server A that buffers the resource so that the user can download the resource from the cache server A.

In the process of developing the present disclosure, the inventor finds at least the following problems in the conventional art:

In the resource buffering system in the conventional art, the loads are not sharable between multiple nodes, and the mechanism of backing up popular resources on multiple nodes is not supported. As shown in FIG. 1, resource A and resource B are buffered in cache server 1; resource F and resource X are buffered in cache server 2; and resource N, resource P, and resource O are buffered in cache server n. If the user wants to download resource F, the user has to download the resource from the cache server 2 that buffers the resource only, and the relatively idle cache server is unable to share loads with the busy cache server. Besides, if a server that buffers a popular resource fails, plenty of users have to download the resource through the external network, which leads to abrupt rise of the egress bandwidth pressure.

SUMMARY OF THE DISCLOSURE

An embodiment of the present disclosure provides a method and an apparatus for buffering and obtaining resources, and a resource buffering system.

An embodiment of the present disclosure provides a resource buffering method, including:

obtaining an access popularity value of a resource from a database at intervals of a first preset time, and obtaining load values of cache servers from the database if determining that the access popularity value reaches a preset first threshold; and determining a duplication cache server for duplicating the resource according to the access popularity value and the load values, and notifying the duplication cache server to duplicate the resource from a cache server that stores the resource and buffer the resource.

An embodiment of the present disclosure provides a resource obtaining method, including:

receiving a resource query request, querying a database according to the resource query request, and determining that a resource requested by a user is buffered; receiving information about all cache servers that buffer the resource and load values of all cache servers that buffer the resource, where the information and the load values are sent by the database; and selecting a target download cache server according to the information about all cache servers that buffer the resource and the load values of all cache servers that buffer the resource, and notifying the user to download the resource from the target download cache server.

An embodiment of the present disclosure provides a resource buffering apparatus, including:

an obtaining module, configured to obtain an access popularity value of a resource from a database at intervals of a first preset time, and obtain load values of cache servers from the database if determining that the access popularity value reaches a preset first threshold; and a first determining module, configured to determine a duplication cache server for duplicating the resource according to the access popularity value and the load values; and a first notifying module, configured to notify the duplication cache server to duplicate the resource from a cache server that stores the resource and buffer the resource.

An embodiment of the present disclosure provides a resource obtaining apparatus, including:

a second receiving module, configured to receive a resource query request; a third determining module, configured to query a database according to the resource query request, and determine that a resource requested by a user is buffered; a third receiving module, configured to receive information about all cache servers that buffer the resource and load values of all cache servers that buffer the resource, where the information and the load values are sent by the database; a fourth determining module, configured to select a target download cache server according to the information about all cache servers that buffer the resource and the load values of all cache servers that buffer the resource; and a third notifying module, configured to notify the user to download the resource from the target download cache server.

An embodiment of the present disclosure provides a resource buffering system, including:

a database, configured to store access popularity values of resources and load values of cache servers; a scheduling server, configured to obtain an access popularity value of a resource from the database at intervals of a first preset time, and obtain the load values of the cache servers from the database if determining that the access popularity value reaches a preset first threshold; and determine a duplication cache server for duplicating the resource according to the access popularity value and the load values, and notify the duplication cache server to duplicate the resource from a cache server that stores the resource; and a cache server, configured to duplicate the resource from the cache server that stores the resource and buffer the resource under control of the scheduling server.

Through the methods for buffering and obtaining resources and the resource buffering system in the embodiments of the present disclosure, the popular resource is duplicated to multiple idle servers, so as to overcome the problems in the prior, namely, the same resource is buffered in only one cache server and the relatively idle cache servers are unable to share loads with busy cache servers. The embodiments of the present disclosure enable multiple cache servers to provide resource downloading services jointly, reduce the load of busy cache servers in the system, and relieve the egress bandwidth pressure.

BRIEF DESCRIPTION OF THE DRAWINGS

To make the technical solution in the present disclosure or in the conventional art clearer, the following outlines the accompanying drawings involved in description of the embodiments of the present disclosure or the conventional art. Apparently, the accompanying drawings outlined below are not exhaustive, and persons of ordinary skill in the art can derive other drawings from such accompanying drawings without any creative effort.

DETAILED DESCRIPTION OF THE EMBODIMENTS

The technical solution of the present disclosure is described below with reference to accompanying drawings and preferred embodiments.

Figure 1:
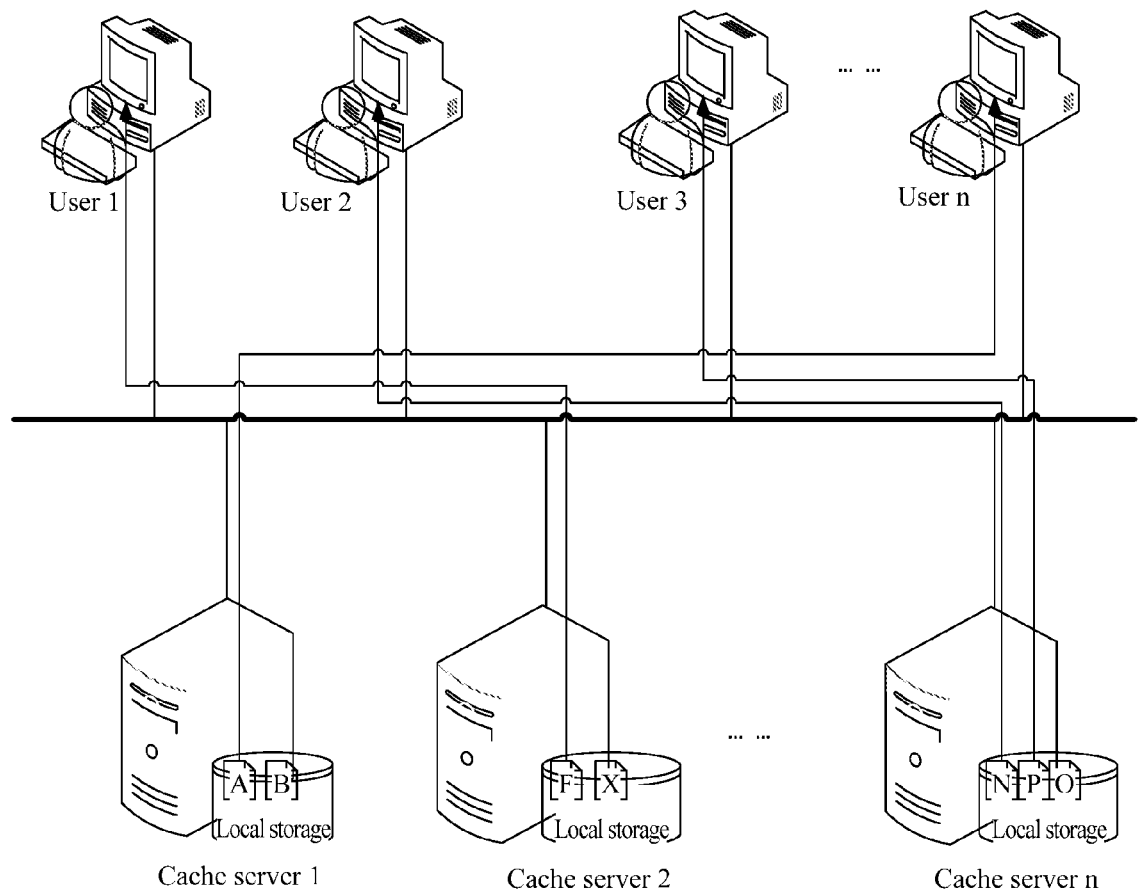
FIG. 1 is a schematic diagram of an architecture of a resource buffering system in the conventional art.

At present disclosure, a carrier-class resource buffering system includes dozens of cache servers. Each cache server bears different resources and serves tens of thousands of online users. Generally, each cache server can bear the load of being accessed by up to 1000-2000 users. Moreover, in conventional art, a resource exists on one cache server only, without any mechanism for processing popular contents or storing multiple backup resources in other cache servers. As shown in FIG. 1, resource A and resource B are buffered in cache server 1; resource F and resource X are buffered in cache server 2; and resource N, resource P, and resource O are buffered in cache server n. If the user wants to download resource F, the user can download it from cache server 2 only.

Because no backup resource exists on other servers, other servers are unable to provide buffer for the user. Consequently, the performance of the resource buffering system is limited by the performance of one server, and is not extensible. Some servers have too heavy loads, but others have light loads. The usage of the light-loaded servers is low, and the relatively idle servers are unable to share loads with busy servers.

Figure 2:
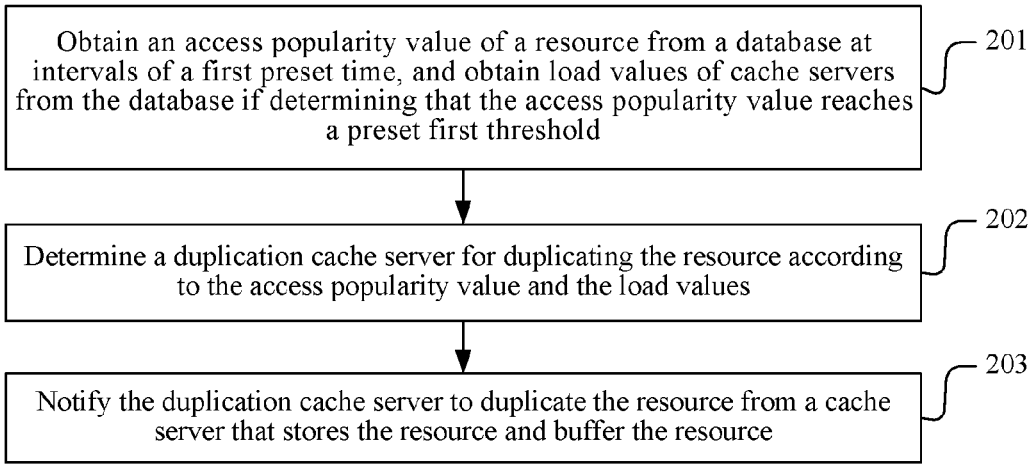
FIG. 2 is a flowchart of a resource buffering method according to an embodiment of the present disclosure.

To solve such problems, a resource buffering method is provided according to an embodiment of the present disclosure. FIG. 2 is a flowchart of a resource buffering method according to an embodiment of the present disclosure. As shown in FIG. 2, the resource buffering method in this embodiment includes the following steps:

Step 201: The scheduling server obtains an access popularity value of a resource from the database at intervals of a first preset time (such as 10 seconds), and judges whether the access popularity value reaches the preset first threshold; obtains the load values of the cache servers from the database if determining that the access popularity value reaches the preset first threshold. In this embodiment, the load values of the cache servers may exclude the cache server that currently buffers the resource.

Step 202: The scheduling server determines a duplication cache server for duplicating the resource according to the access popularity value and the load values. That is, the scheduling server selects a server for duplicating the resource among the cache servers except the cache server that currently buffers the resource. In the following description, the cache server for duplicating the resource is briefly called a "duplication cache server".

Step 203: The scheduling server notifies the duplication cache server to duplicate the resource from the cache server that stores the resource and buffer the resource.

As revealed in the description above, in this embodiment, a mechanism of judging popular resources is applied in the buffering system, and the popular resource is duplicated into multiple cache servers. Therefore, the access load is shared between the servers. Through the scheduling server, the scheduling is performed between the cache servers, and multiple cache servers provide services jointly. Therefore, the extensibility of the buffering system and the efficiency of downloading resources are improved, the loads of busy cache servers in the system are reduced, and the egress bandwidth pressure is relieved.

The following describes a procedure of handling a request from a user who requests to download a non-buffered resource according to an embodiment of the present disclosure.

Figure 3A:
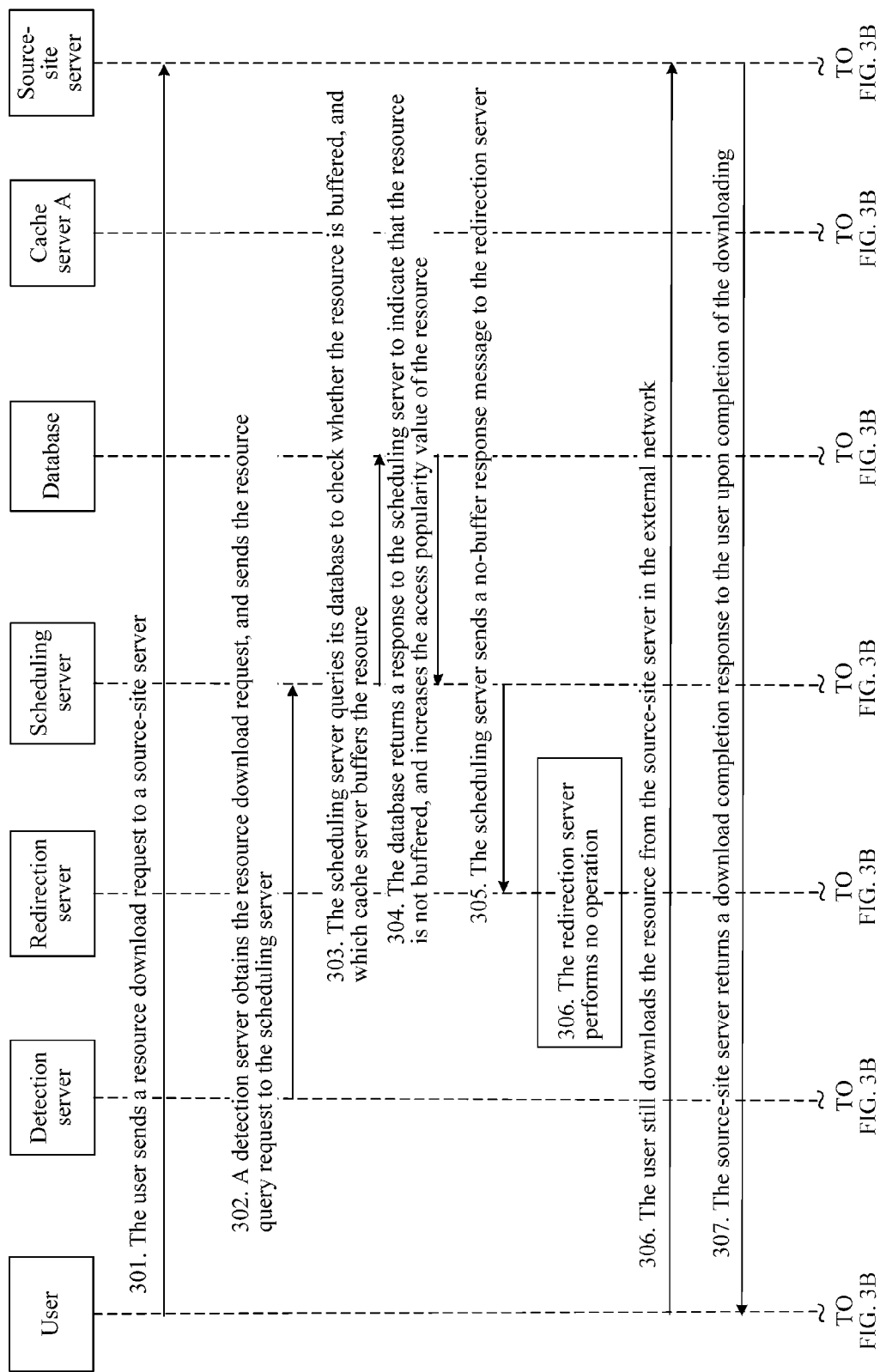
FIGS. 3A and 3B are signaling flowcharts of a user requesting to download a non-buffered resource according to an embodiment of the present disclosure.
Figure 3B:
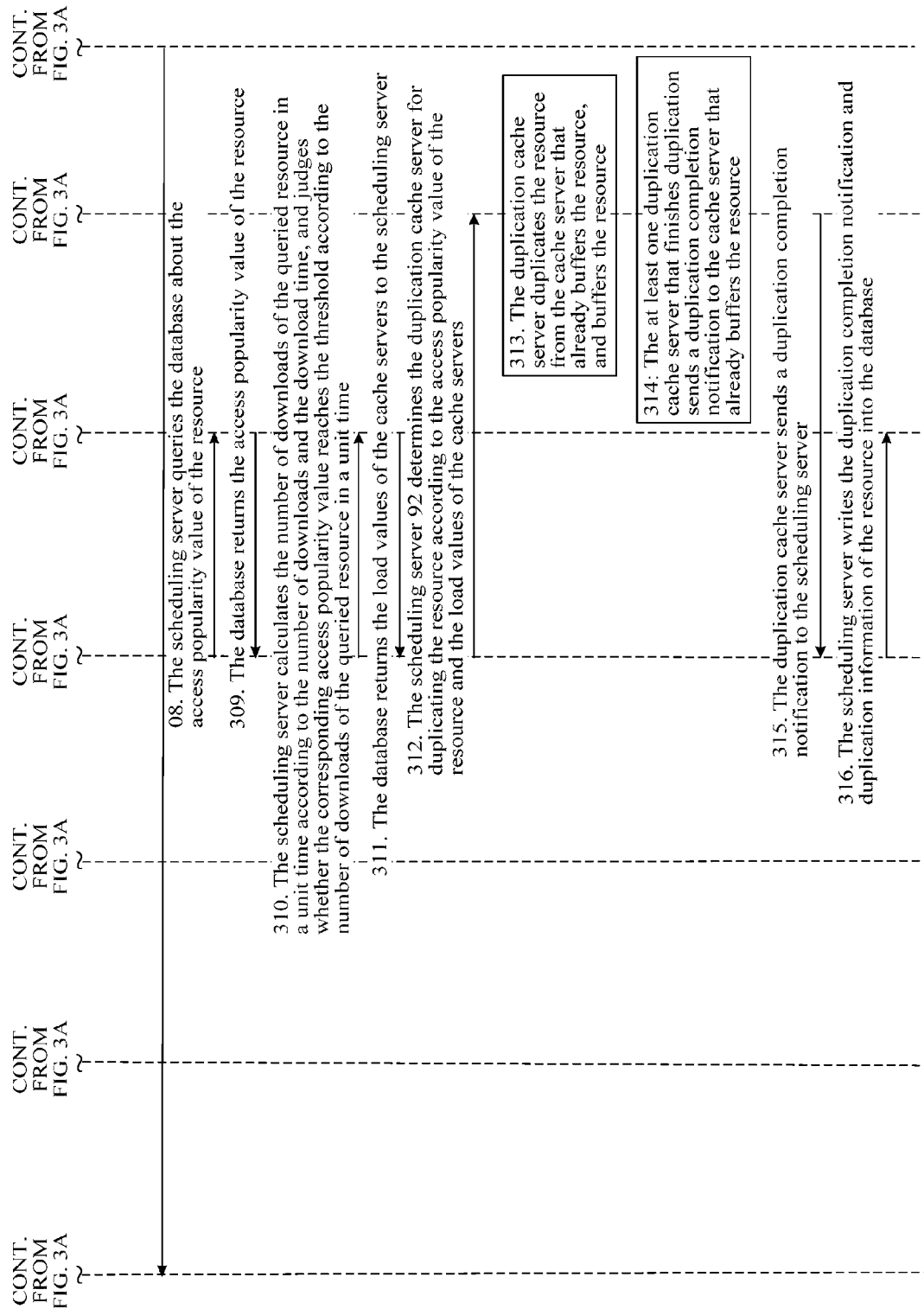

FIGS. 3A and 3B are a signaling flowchart of a user requesting to download a non-buffered resource according to an embodiment of the present disclosure. As shown in FIGS. 3A and 3B are, the procedure includes the following steps:

Step 301: The user sends a resource download request to a source-site server.

Step 302: A detection server in the resource buffering system obtains the resource download request sent by the user to the source-site server, and sends a resource query request to the scheduling server.

Step 303: The scheduling server queries its database according to the resource query request to check whether the resource is buffered in the cache server of the resource buffering system, and instructs the database to increase the access popularity value of the resource by 1. The access popularity value is determined according to a preset algorithm. For example, the access popularity value of the resource is determined according to the number of downloads of the resource and the download time of each download of the resource.

Step 304: The database checks whether the resource is buffered, and updates the access popularity value of the resource. Because the database finds that the resource is not buffered, the database sends a no-buffer response message to the scheduling server.

Step 305: Upon receiving the no-buffer response message, the scheduling server forwards the no-buffer response message to a redirection server.

Step 306: The redirection server responds to the no-buffer response message. Because the resource is not buffered in the resource buffering system, the redirection server does not need to perform redirection, and the user still downloads the resource from the source-site server (external network).

Step 307: After the user finishes downloading, the source-site server sends a download completion message to the user. With increase of the download operations of the user, the resource buffering system downloads the frequently downloaded resource onto a cache server, and subsequent users will download the resource from the cache server.

Step 308: The scheduling server queries the database about the access popularity value of the resource.

The scheduling server queries the database periodically about the access popularity value of the resource. In this embodiment, the scheduling server may query the access popularity values of all resources, or query the access popularity value of a current resource. The access popularity value includes the number of downloads and the download time.

Step 309: The database returns the access popularity value of the resource. The access popularity value may include the number of downloads of the resource being queried, and the download time.

Step 310: The scheduling server calculates the number of downloads of the queried resource in a unit time according to the number of downloads and the download time, and judges whether the corresponding access popularity value reaches the threshold according to the number of downloads of the queried resource in a unit time. That is, the scheduling server judges whether the users massively download the resource from the cache server that buffers the resource. In the following description, the resource of such characteristics is called a "popular resource". If the scheduling server determines that the access popularity value does not reach the preset threshold, the scheduling server does not need to perform any operation; if determining that the access popularity value reaches the threshold, the scheduling server queries the database about the load values of cache servers (except the cache server that already buffers the resource). All cache servers write their load values into the database at intervals (such as 5 seconds) so that the load values are available to the scheduling server.

Step 311: The database returns the load values of the cache servers to the scheduling server.

Step 312: The scheduling server determines a duplication cache server for duplicating the resource according to the access popularity value of the resource and the load values of the cache servers. Further, the scheduling server may select a light-loaded server to duplicate the resource according to the access popularity value and the load values.

Specifically, in step 312, the scheduling server may select a light-loaded server through (but without being limited to) the following steps: 1. The scheduling server determines the number of downloads of the resource in a unit time according to the access popularity value of the resource, and determines the level of the number of downloads of the resource in a unit time according to the number of downloads of the resource in a unit time; 2. the scheduling server sorts all cache servers except the cache server that already buffers resource in order of the load value, and obtains a sorting result; and 3. the scheduling server determines the required number of duplication cache servers according to the level of the number of downloads, and selects cache servers as duplication cache servers in the sorting result according to the required number of duplication cache servers, where the selected cache servers are those whose load values are lower than a preset second threshold. Specifically, the criteria of determining the required number of duplication cache servers according to the level of the number of downloads include: if a resource is downloaded for more times in a unit time, the resource has a higher level of the number of downloads in a unit, and more cache servers need to be selected as duplication cache servers for the resource.

In other words, after determining the level of the number of downloads of the resource in a unit time, the scheduling server determines the number of idle servers according to the load value, determines the number of duplicates of the resource according to the number of idle servers, and then schedules the idle cache servers to duplicate popular resources to the source-site server.

Step 313: The duplication cache server duplicates the resource from the cache server that already buffers the resource, and buffers the resource.

Step 314: The duplication cache server that finishes duplication sends a duplication completion notification to the cache server that already buffers the resource.

Step 315: The duplication cache server sends a duplication completion notification to the scheduling server.

Step 316: The scheduling server writes the duplication completion notification and duplication information into the database, where the duplication information is information about the duplication cache servers that buffer the resource. Subsequently, when a user requests to download the resource, the database can query the cache servers that buffer the resource according to the duplication information of the resource.

The foregoing operations reveal that the technical solution of this embodiment abandons the practice of letting a single cache server undertake the access to popular resources. Instead, the popular resources are duplicated onto multiple idle cache servers automatically, and therefore, multiple cache servers share loads, and the cache servers are made full use of. Moreover, when one or more cache servers fail, the service of accessing the popular resources is still available to the user without interruption. Because multiple cache servers provide services jointly, the egress bandwidth pressure is relieved, the abrupt rise of the egress bandwidth pressure is prevented, and the reliability and the extensibility of the system are improved.

After the user downloads a resource, if the number of downloads of the resource decreases, the space occupied by the resource needs to be recycled. In the process of recycling the resource space, the system determines the number of duplicates of the resource that need to be reserved according to the access popularity of the resource. Afterward, the system deletes the resources in the cache servers of a higher load value according to the determined number of duplicates that need to be reserved and the load values of the cache servers. In this way, the system resources are optimized.

Figure 4:
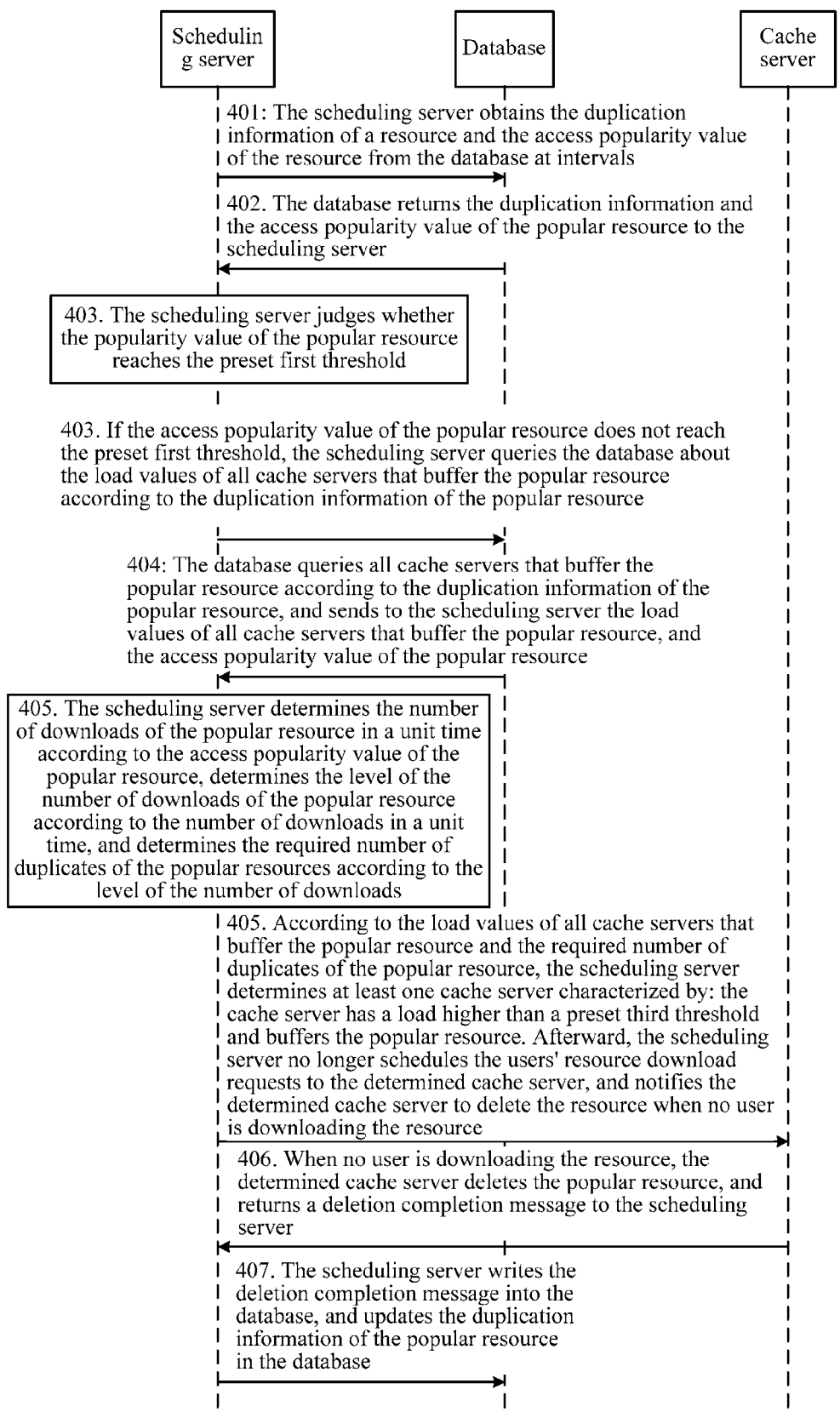
FIG. 4 is a signaling flowchart of recycling space of popular resources according to an embodiment of the present disclosure.

The following gives details about the process of recycling space of popular resources with reference to FIG. 4. FIG. 4 is a signaling flowchart of recycling space of popular resources according to an embodiment of the present disclosure. As shown in FIG. 4, the process includes the following steps:

Step 401: The scheduling server obtains the duplication information of a resource and the access popularity value of the resource from the database at intervals. In this embodiment, the resource refers to one or more popular resources.

Step 402: The database returns the duplication information and the access popularity value of the popular resource to the scheduling server. The access popularity value includes the number of downloads and the download time.

Step 403: The scheduling server judges whether the access popularity value of the hot resource reaches a preset first threshold, and does not need to perform any operation if the access popularity value of the hot resource reaches the preset first threshold; or, if the access popularity value of the hot resource does not reach the preset first threshold, the scheduling server queries the database about the load values of all cache servers that buffer the popular resource according to the duplication information of the popular resource.

Step 404: The database queries all cache servers that buffer the popular resource according to the duplication information of the popular resource, and sends to the scheduling server the load values of all cache servers that buffer the popular resource, and the access popularity value of the popular resource.

Step 405: The scheduling server determines the number of downloads of the popular resource in a unit time according to the access popularity value of the popular resource, determines the level of the number of downloads of the popular resource according to the number of downloads in a unit time, and determines the required number of duplicates of the popular resources according to the level of the number of downloads. Afterward, according to the load values of all cache servers that buffer the popular resource and the required number of duplicates of the popular resource, the scheduling server determines at least one cache server characterized by: the cache server has a load higher than a preset third threshold and buffers the popular resource. Afterward, the scheduling server no longer schedules the users' resource download requests to the determined cache server, and notifies the determined cache server to delete the resource when no user is downloading the resource. That is, the hot resource on the higher-loaded cache server is deleted first.

Step 406: When no user is downloading the resource, the determined cache server deletes the popular resource, and returns a deletion completion message to the scheduling server.

Step 407: The scheduling server writes the deletion completion message into the database, and updates the duplication information of the popular resource in the database.

The foregoing operations reveal that the mechanism of recycling the popular resources improves usage of the storage space, and prevents waste of the storage space.

Moreover, the resource buffering system implements load sharing and automatic cleanup of the storage space.

Figure 5:
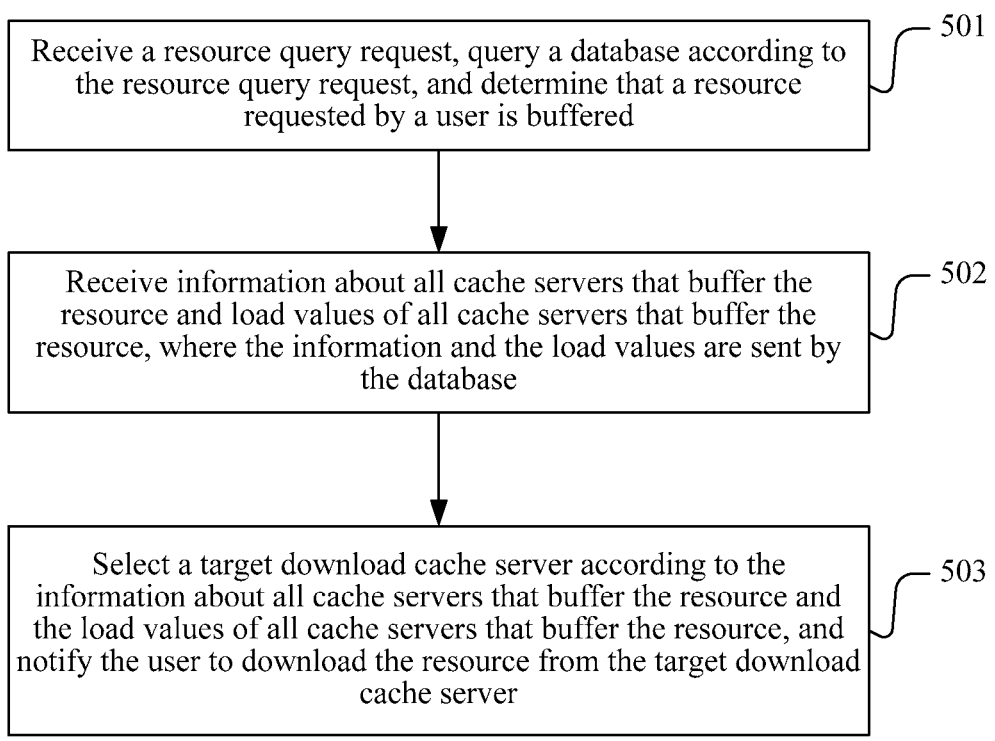
FIG. 5 is a flowchart of a resource obtaining method according to an embodiment of the present disclosure.

An embodiment of the present disclosure provides a method for obtaining buffered resources. FIG. 5 is a flowchart of a resource obtaining method according to an embodiment of the present disclosure. As shown in FIG. 5, the method for obtaining buffered resources in this embodiment includes the following steps:

Step 501: Receive a resource query request, query a database according to the resource query request, and determine that a resource requested by a user is buffered.

Step 502: Receive information about all cache servers that buffer the resource and load values of all cache servers that buffer the resource, where the information and the load values are sent by the database.

Step 503: Select a target download cache server according to the information about all cache servers that buffer the resource and the load values of all cache servers that buffer the resource, and notify the user to download the resource from the target download cache server. Specifically, a redirection server notifies the user to download the resource from a target download cache server.

Through the foregoing operations, the user can download resources from multiple cache servers in the system. When one of the cache servers fails, the user can download the resource from another cache server that buffers the resource, which improves efficiency and speed of downloading resources.

Figure 6:
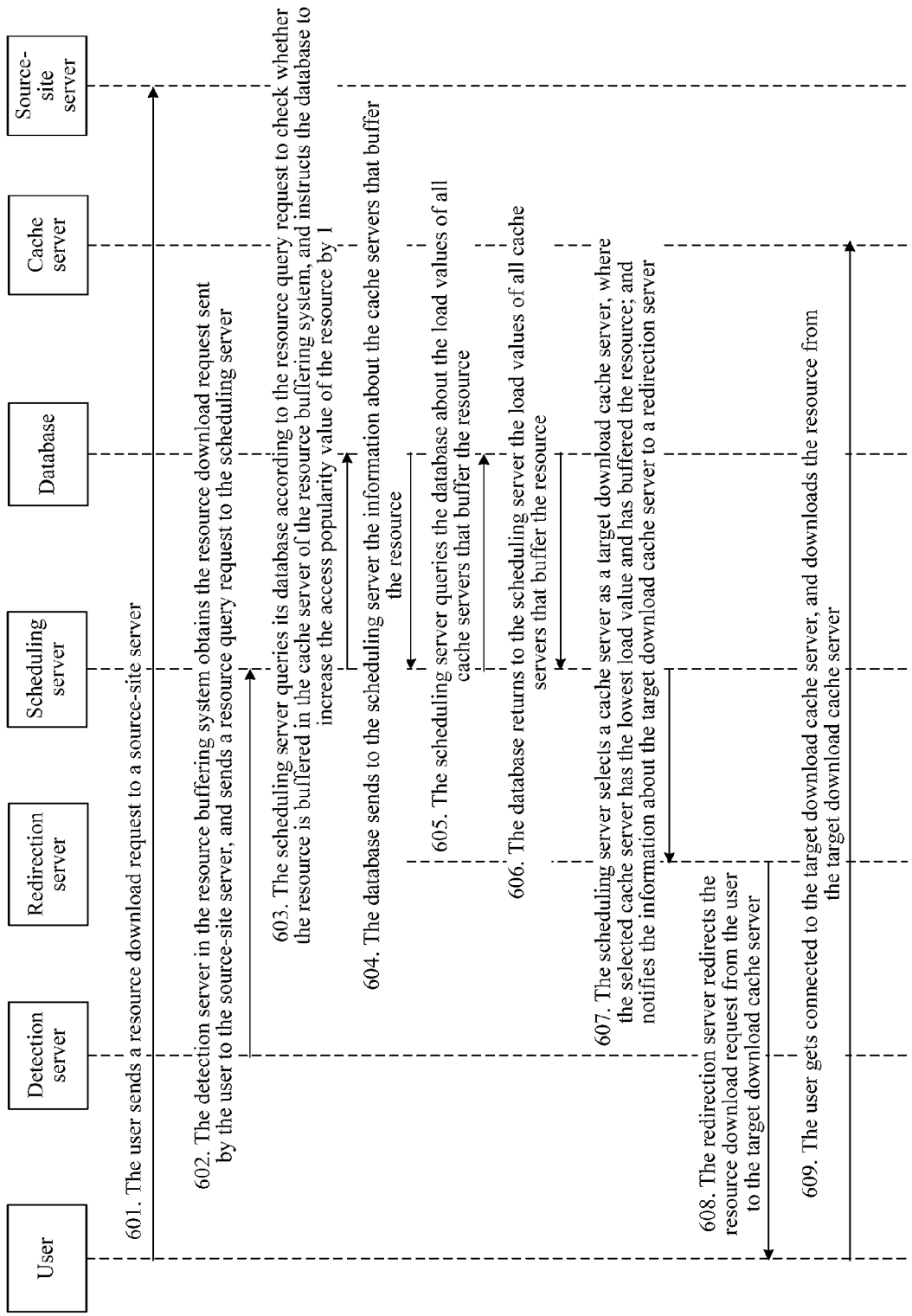
FIG. 6 is a signaling flowchart of a user requesting to download a buffered resource according to an embodiment of the present disclosure.

The following describes a procedure of handling a request from a user who requests to download a buffered resource according to an embodiment of the present disclosure. FIG. 6 is a signaling flowchart of a user requesting to download a buffered resource according to an embodiment of the present disclosure. As shown in FIG. 6, the procedure includes the following steps:

Step 601: The user sends a resource download request to a source-site server.

Step 602: A detection server in the resource buffering system obtains the resource download request sent by the user to the source-site server, and sends a resource query request to the scheduling server.

Step 603: The scheduling server queries its database according to the resource query request to check whether the resource is buffered in the cache server of the resource buffering system, and instructs the database to increase the access popularity value of the resource by 1.

Step 604: The database checks whether the resource is buffered, and updates the access popularity value of the resource. After determining that the resource is buffered, the database checks the cache servers that have buffered the resource, and sends the information about all cache servers that buffer the resource to the scheduling server.

Step 605: The scheduling server queries the database about the load values of all cache servers that buffer the resource.

Step 606: The database returns to the scheduling server the load values of all cache servers that buffer the resource.

Step 607: The scheduling server selects a cache server as a target download cache server, where the selected cache server has the lowest load value and has buffered the resource; and notifies the information about the target download cache server to a redirection server.

Step 608: The redirection server redirects the resource download request from the user to the target download cache server.

Step 609: The user gets connected to the target download cache server, and downloads the resource from the target download cache server.

The foregoing operations reveal that the technology of sharing the loads of accessing popular resources among multiple nodes fulfills the user requirements of accessing popular data, solves the system bottleneck caused by access to popular resources, improves usage of the cache servers to the utmost, and provides high extensibility and high reliability.

This embodiment is widely applicable to various application scenarios in which data is duplicated automatically between different cache servers in a resource buffering system. Through automatic duplication, different application functions are implemented, including but without being limited to: 1. fulfilling dynamic extension of a content buffering system, and adding cache servers dynamically when the performance or capacity of cache servers is deficient without impacting operation of the system; 2. providing data security for a content buffering system, such as antivirus; 3. fulfilling dynamic migration of a resource buffering system, for example, storing resources on different servers according to the access popularity of files; and 4. fulfilling classified storage of contents of a resource buffering system, for example, migrating contents to different application servers automatically according to the amount of access to the files.

Figure 7:
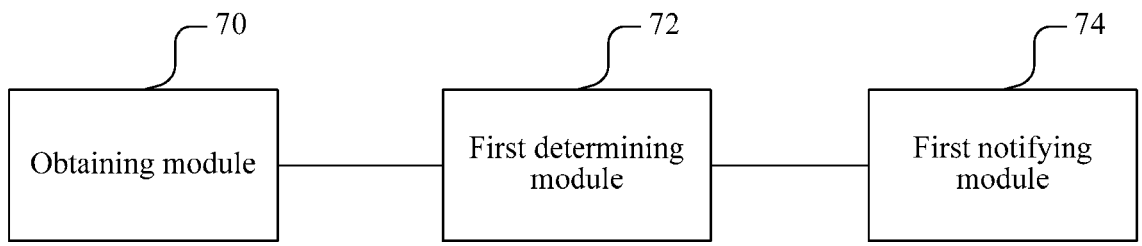
FIG. 7 is a schematic diagram of a resource buffering apparatus according to an embodiment of the present disclosure.

An embodiment of the present disclosure provides a resource buffering apparatus. FIG. 7 is a schematic diagram of a resource buffering apparatus according to an embodiment of the present disclosure. As shown in FIG. 7, the resource buffering apparatus in this embodiment includes an obtaining module 70, a first determining module 72, and a first notifying module 74. The following gives details about the resource buffering apparatus in this embodiment. In this embodiment, the resource buffering apparatus may be a scheduling server.

Specifically, the obtaining module 70 is configured to obtain an access popularity value of a resource from a database at intervals of a first preset time (such as 10 seconds), and obtain load values of cache servers from the database if determining that the access popularity value reaches a preset first threshold. In this embodiment, at the time of obtaining the load values of the cache servers from the database, the cache servers may exclude the cache server that currently buffers the resource.

The first determining module 72 determines a duplication cache server for duplicating the resource according to the access popularity value and the load values. Specifically, the first determining module 72 further includes: a determining submodule, a sequencing module, and a selecting module.

The determining submodule determines the level of the number of downloads of a resource in a unit time according to the access popularity value; the sequencing number sorts all cache servers except the cache server that already buffers resource in order of the load value, and obtains a sorting result; and the selecting module determines the required number of duplication cache servers according to the level of the number of downloads, and selects cache servers as duplication cache servers in the sorting result according to the required number of duplication cache servers, where the selected cache servers are those whose load values are lower than a preset second threshold. Specifically, the criteria of determining the required number of duplication cache servers according to the level of the number of downloads include: if a resource is downloaded for more times in a unit time, the resource has a higher level of the number of downloads in a unit, and more cache servers need to be selected as duplication cache servers for the resource.

After the first determining module 72 determines the duplication cache server for duplicating the resource, the first notifying module 74 notifies the duplication cache server to duplicate the resource from a cache server that stores the resource and buffer the resource.

The foregoing operations reveal that the technical solution of this embodiment abandons the practice of letting a single cache server undertake the access to popular resources. Instead, the popular resources are duplicated onto multiple idle cache servers automatically, and therefore, multiple cache servers share loads, and the cache servers are made full use of. Moreover, when one or more cache servers fail, the service of accessing the popular resources is still available to the user without interruption. Because multiple cache servers provide services jointly, the egress bandwidth pressure is relieved, the abrupt rise of the egress bandwidth pressure is prevented, and the reliability and the extensibility of the system are improved.

After the user downloads a resource, if the number of downloads of the resource decreases, the space occupied by the resource needs to be recycled. In the process of recycling the resource space, the system determines the number of duplicates of the resource that need to be reserved according to the access popularity of the resource. Afterward, the system deletes the resources in the cache servers of a higher load value according to the determined number of duplicates that need to be reserved and the load values of the cache servers. In this way, the system resources are optimized.

Specifically, the resource buffering apparatus further includes: a second determining module, a second notifying module, a first receiving module, and an updating module.

When the access popularity value of the resource stored in the duplication cache server is lower than the first threshold, the second determining module determines at least one cache server among the cache servers that already buffer the resource. Specifically, the second determining module determines the number of downloads of the popular resource in a unit time according to the access popularity value of the popular resource, determines the level of the number of downloads of the popular resource according to the number of downloads in a unit time, and determines the required number of duplicates of the popular resources according to the level of the number of downloads. Afterward, according to the load values of all cache servers that buffer the popular resource and the required number of duplicates of the popular resource, the second determining module determines at least one cache server characterized by: the cache server has a load higher than a preset third threshold and buffers the popular resource.

Afterward, the second notifying module notifies the determined cache server to delete the resource when no user is downloading the resource. When no user is downloading the resource, the cache server deletes the popular resource, and returns a deletion completion message to the first receiving module of the scheduling server. The first receiving module receives the deletion completion message sent by the cache server. The updating module writes the deletion completion message into the database, and updates the duplication information of the resource in the database.

The foregoing operations reveal that the mechanism of recycling the popular resources improves usage of the storage space, and prevents waste of the storage space. Moreover, the resource buffering system implements load sharing and automatic cleanup of the storage space.

Figure 8:
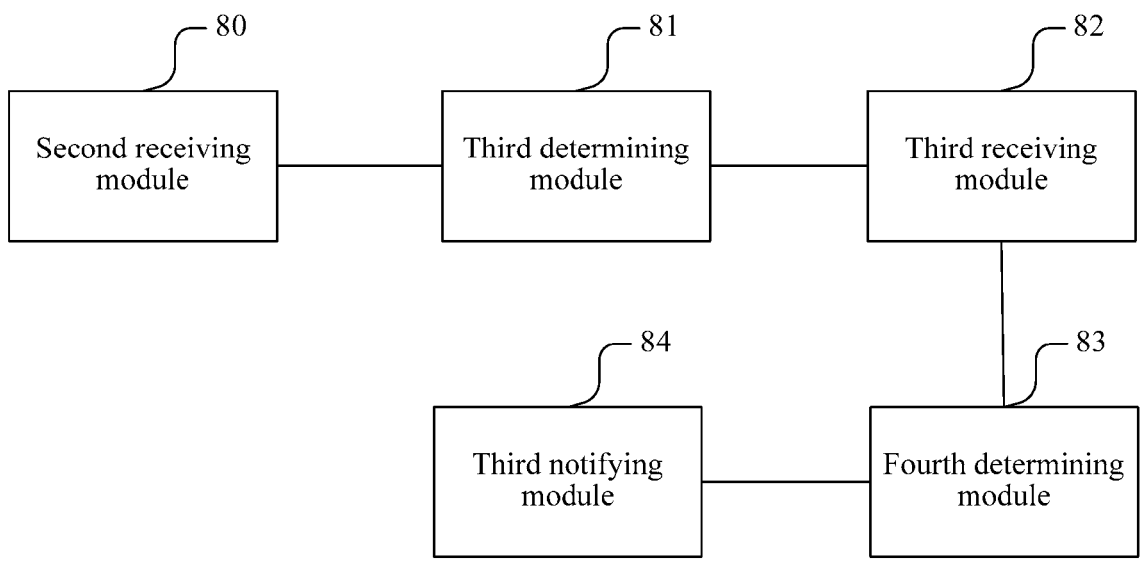
FIG. 8 is a schematic diagram of a resource obtaining apparatus according to an embodiment of the present disclosure.

An embodiment of the present disclosure provides a resource obtaining apparatus. FIG. 8 is a schematic diagram of a resource obtaining apparatus according to an embodiment of the present disclosure. As shown in FIG. 8, the resource obtaining apparatus in this embodiment includes: a second receiving module 80, a third determining module 81, a third receiving module 82, a fourth determining module 83, and a third notifying module 84. The following gives details about the resource obtaining apparatus in this embodiment. In this embodiment, the resource obtaining apparatus is a scheduling server.

Specifically, first, the user sends a resource download request to the source-site server. The detection server in the resource buffering system obtains the resource download request sent by the user to the source-site server, and sends a resource query request to the scheduling server. The second receiving module 80 of the scheduling server receives the resource query request. Afterward, the third determining module 81 queries the database according to the resource query request, and determines that the resource requested by the user is buffered. After determining that the resource is buffered, the database finds the cache servers that have buffered the resource, and sends the information about all cache servers that buffer the resource to the scheduling server. The third receiving module 82 of the scheduling server receives the information about all cache servers that buffer the resource and the load values of all cache servers that buffer the resource. Afterward, the fourth determining module 83 selects a target download cache server according to the information about all cache servers that buffer the resource and the load values of all cache servers that buffer the resource. The third notifying module 84 notifies the information about the target download cache server to the redirection server, and the redirection server redirects the resource download request from the user to the target download cache server. Afterward, the user gets connected to the target download cache server, and downloads the resource from the target download cache server.

Through the foregoing operations, the user can download resources from multiple cache servers in the system. When one of the cache servers fails, the user can download the resource from another cache server that buffers the resource, which improves efficiency and speed of downloading resources.

Figure 9:
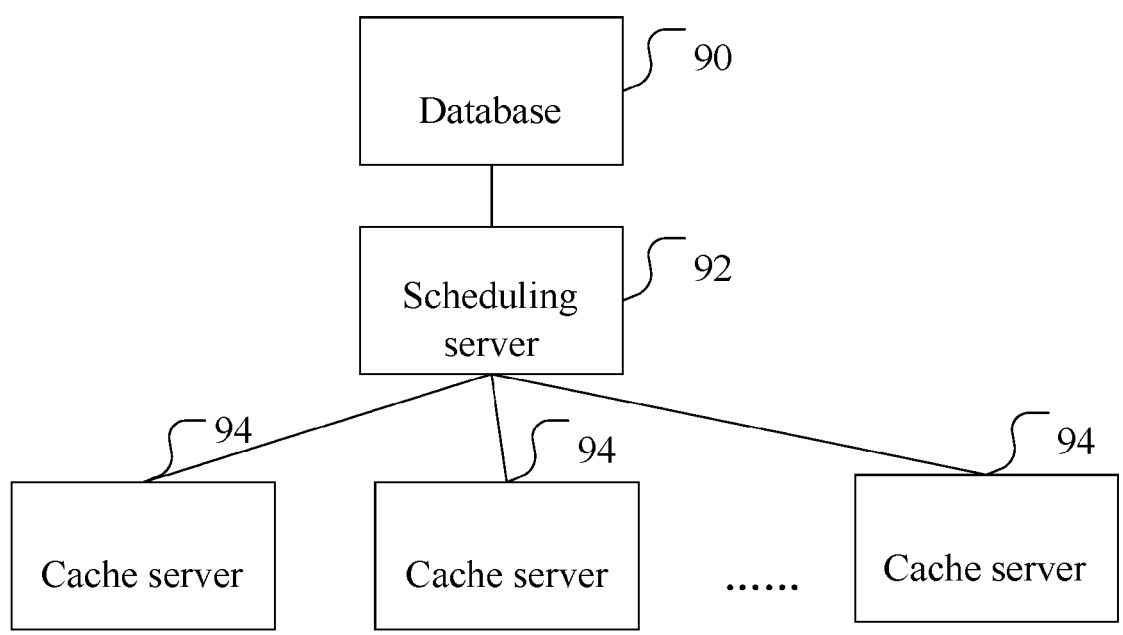
FIG. 9 is a schematic diagram of a resource buffering system according to an embodiment of the present disclosure.

An embodiment of the present disclosure provides a resource buffering system. FIG. 9 is a schematic diagram of a resource buffering system according to an embodiment of the present disclosure. As shown in FIG. 9, the resource buffering system in this embodiment includes: a database 90, a scheduling server 92, and cache servers 94. The following gives details about the resource buffering system in this embodiment.

Specifically, the scheduling server 92 obtains the access popularity value of the resource from the database 90 at intervals of a first preset time (such as 10 seconds), and judges whether the access popularity value reaches a preset first threshold; and obtains load values of the cache servers 94 from the database 90 if determining that the access popularity value reaches the preset first threshold. Afterward, the scheduling server 92 determines at least one cache server 94 for duplicating the resource according to the access popularity value and the load values. The at least one cache server 94 duplicates the resource from the cache server that stores the resource, and buffers the resource under control of the scheduling server 92. The database 90 is configured to store the access popularity values of resources and load values of the cache servers 94. In this embodiment, the database 90 is further configured to store duplication information of all resources.

This embodiment may further include a detection server and a redirection server. The detection server is configured to obtain the resource download request sent by the user to the source-site server, and send a resource query request to the scheduling server 92 after obtaining the resource download request. The redirection server is configured to redirect the resource download request from the user to the target download cache server under control of the scheduling server 92 after the scheduling server 92 determines the target download cache server that serves the user, and therefore, the user can download the desired resource from the target download cache server.

The foregoing operations reveal that through the mechanism of duplicating popular resources in the resource buffering system, the loads are shared among the servers in the resource buffering system, and the access to popular resources does not cause system bottlenecks any longer.

The following describes a procedure of handling a request from a user who requests to download a non-buffered resource, a procedure of handling a request from a user who requests to download a buffered resource, and a mechanism of recycling resource space according to an embodiment of the present disclosure.

First, the following describes a procedure of handling a request from a user who requests to download a non-buffered resource.

The user sends a resource download request to the source-site server. The detection server in the resource buffering system obtains the resource download request sent by the user to the source-site server, and sends a resource query request to the scheduling server 92. The scheduling server 92 queries its database 90 according to the resource query request to check whether the resource is buffered in the cache server 94 of the resource buffering system, and instructs the database 90 to increase the access popularity value of the resource by 1. Afterward, the database 90 checks whether the resource is buffered, and updates the access popularity value of the resource. Because the database 90 finds that the resource is not buffered, the database 90 sends a no-buffer response message to the scheduling server 92. After receiving the no-buffer response message, the scheduling server 92 forwards the no-buffer response message to the redirection server. Because the resource is not buffered in the resource buffering system, the redirection server does not need to perform redirection, and the user still downloads the resource from the source-site server (external network). After the user finishes downloading, the source-site server sends a download completion message to the user. With increase of the download operations of the user, the resource buffering system downloads the frequently downloaded resource onto a cache server 94, and subsequent users will download the resource from the cache server.

Subsequently, the scheduling server 92 queries the database 90 about the access popularity value of the resource. The database 90 returns the access popularity value of the resource. The scheduling server 92 judges whether the access popularity value reaches the preset first threshold according to the obtained access popularity value, namely, judges whether the user massively downloads the resource from the cache server that buffers the resource. In the following description, the resource of such characteristics is called a "popular resource". If the scheduling server 92 determines that the access popularity value does not reach the preset first threshold, the scheduling server 92 does not need to perform any operation; if determining that the access popularity value reaches the first threshold, the scheduling server 92 queries the database 90 about the load values of cache servers 94 (except the cache server that already buffers the resource). All cache servers 94 write their load values into the database 90 at intervals (such as 5 seconds) so that the load values are available to the scheduling server 92.

In the foregoing process, the scheduling server 92 may judge whether the popularity value reaches the preset threshold through (but without being limited to) the following steps: 1. The scheduling server 92 obtains the access popularity value of the resource from the database 90 at intervals, where the access popularity value of the resource is determined according to a preset algorithm, for example, according to the number of downloads of the resource and the download time of each download of the resource. 2. The scheduling server 92 calculates the number of downloads of the resource in a unit time according to the number of downloads and the download time, and judges whether the access popularity value reaches the preset first threshold according to the number of downloads of the resource in a unit time.

Afterward, the database 90 returns to the scheduling server 92 the load values of all cache servers 94 except the cache server that already buffers the resource. According to the access popularity value of the resource and the load values of all cache servers 94 except the cache server that already buffers the resource, the scheduling server 92 determines at least one duplication cache server 94 for duplicating the resource except the cache server that already buffers the resource. That is, the scheduling server 92 selects a relatively light-loaded cache server for duplicating the resource according to the access popularity value and the load values.

Specifically, the scheduling server 92 may select a relatively light-loaded server through (but without being limited to) the following steps: 1. The scheduling server 92 determines the number of downloads of the resource in a unit time according to the access popularity value of the resource, and determines the level of the number of downloads of the resource in a unit time according to the number of downloads of the resource in a unit time; 2. the scheduling server 92 sorts all cache servers 94 except the cache server that already buffers resource in order of the load value, and obtains a sorting result; and 3. the scheduling server 92 determines the required number of duplication cache servers according to the level of the number of downloads, and selects cache servers 94 as duplication cache servers in the sorting result according to the required number of duplication cache servers, where the selected cache servers are those whose load values are lower than a preset second threshold. Specifically, the criteria of determining the required number of duplication cache servers according to the level of the number of downloads include: if a resource is downloaded for more times in a unit time, the resource has a higher level of the number of downloads in a unit, and more cache servers 94 need to be selected as duplication cache servers for the resource.

Afterward, at least one duplication cache server 94 duplicates the resource from the cache server that stores the resource, and buffers the resource. The cache server that stores the resource sends a duplication completion notification to the at least one duplication cache server 94 that finishes duplication. The at least one duplication cache server 94 sends a duplication completion notification to the scheduling server 92. The scheduling server 92 obtains the duplication completion notification sent by at least one duplication cache server 94. Subsequently, the scheduling server 92 writes the duplication completion notification and the duplication information of the resource into the database 90. Afterward, when a user requests to download the resource, the database 90 can query the cache servers 94 that buffer the resource according to the duplication information of the resource.

The foregoing operations reveal that the technical solution of this embodiment abandons the practice of letting a single cache server undertake the access to popular resources. Instead, the popular resources are duplicated onto multiple idle cache servers automatically, and therefore, multiple cache servers share loads, and the reliability and the extensibility of the system are improved. Moreover, through the mechanism of duplicating popular resources, concurrent access to popular data can be shared by multiple cache servers, and the cache servers can be made full use of. Further, when one or more cache servers fail, the service of accessing the popular resources is still available to the user without interruption. Because multiple cache servers provide services jointly, the egress bandwidth pressure is relieved, and the abrupt rise of the egress bandwidth pressure is prevented.

The following gives details of a procedure of handling a request from a user who requests to download a buffered resource.

Specifically, the user sends a resource download request to a source-site server. A detection server in the resource buffering system obtains the resource download request sent by the user to the source-site server, and sends a resource query request to the scheduling server 92. The scheduling server 92 queries its database 90 according to the resource query request to check whether the resource is buffered in the cache server 94 of the resource buffering system. Subsequently, the scheduling server 92 instructs the database 90 to increase the access popularity value of the resource by 1, namely, update the access popularity value of the resource. The database 90 checks whether the resource is buffered according to the duplication information of the resource, and updates the access popularity value of the resource. After determining that the resource is buffered, the database 90 finds the cache servers 94 that have buffered the resource, and sends the information about all cache servers 94 that buffer the resource to the scheduling server 92. The scheduling server 92 queries the database 90 about the load values of all cache servers 94 that buffer the resource. The database 90 returns the load values of all cache servers 94 that buffer the resource to the scheduling server 92. Among all cache servers 94 that buffer the resource, the scheduling server 92 selects the cache server with the lowest load value as a target download cache server, and notifies the information about the target download cache server 94 to a redirection server. The redirection server redirects the resource download request from the user to the target download cache server 94. The user gets connected to the target download cache server 94, and downloads the resource from the target download cache server 94.

The foregoing operations reveal that the technology of sharing the loads of accessing popular resources among multiple nodes fulfills the user requirements of accessing popular data, solves the system bottleneck caused by access to popular resources, improves usage of the cache servers 94 to the utmost, and provides high extensibility and high reliability.

The following gives details about the process of recycling space of popular resources.

Specifically, the scheduling server 92 obtains the duplication information of a resource and the access popularity value of the resource from the database 90 at intervals. In this embodiment, the resource refers to one or more popular resources. The database 90 returns the access popularity value of the popular resource to the scheduling server 92. The scheduling server 92 judges whether the popularity value of the popular resource reaches the preset threshold, and does not need to perform any operation if the access popularity value reaches the preset threshold. If the access popularity value of the popular resource does not reach the preset threshold, the scheduling server 92 queries the database 90 about the load values of cache servers 94 that buffer the popular resource. The database 90 queries all duplication cache servers 94 that buffer the popular resource according to the duplication information of the popular resource, and sends to the scheduling server 92 the load values of all duplication cache servers 94 that buffer the popular resource, and the access popularity value of the popular resource. Subsequently, the scheduling server 92 determines the number of downloads of the popular resource in a unit time according to the access popularity value (namely, download time and number of downloads) of the popular resource, determines the level of the number of downloads of the popular resource according to the number of downloads in a unit time, and determines the required number of duplicates of the popular resources according to the level of the number of downloads. Afterward, according to the load values of the cache servers 94 that buffer the popular resource and the required number of duplicates of the popular resource, the scheduling server 92 determines at least one cache server 94 whose popular resource needs to be deleted, where the determined cache server 94 has a load value higher than a preset third threshold and buffers the popular resource. Afterward, the scheduling server 92 no longer schedules the users' resource download requests to the determined cache server, and notifies the determined cache server to delete the resource when no user is downloading the resource. That is, the hot resource on the higher-loaded cache server 94 is deleted first. When no user is downloading the resource, the at least one determined cache server 94 whose load value is higher than the preset third threshold deletes the popular resource, and returns a deletion completion message to the scheduling server 92. The scheduling server 92 writes the deletion completion message into the database 90, and updates the duplication information of the popular resource in the database 90.

The foregoing operations reveal that the mechanism of recycling the popular resources improves usage of the storage space, and prevents waste of the storage space. Moreover, the resource buffering system implements load sharing and automatic cleanup of the storage space.

Figure 10:
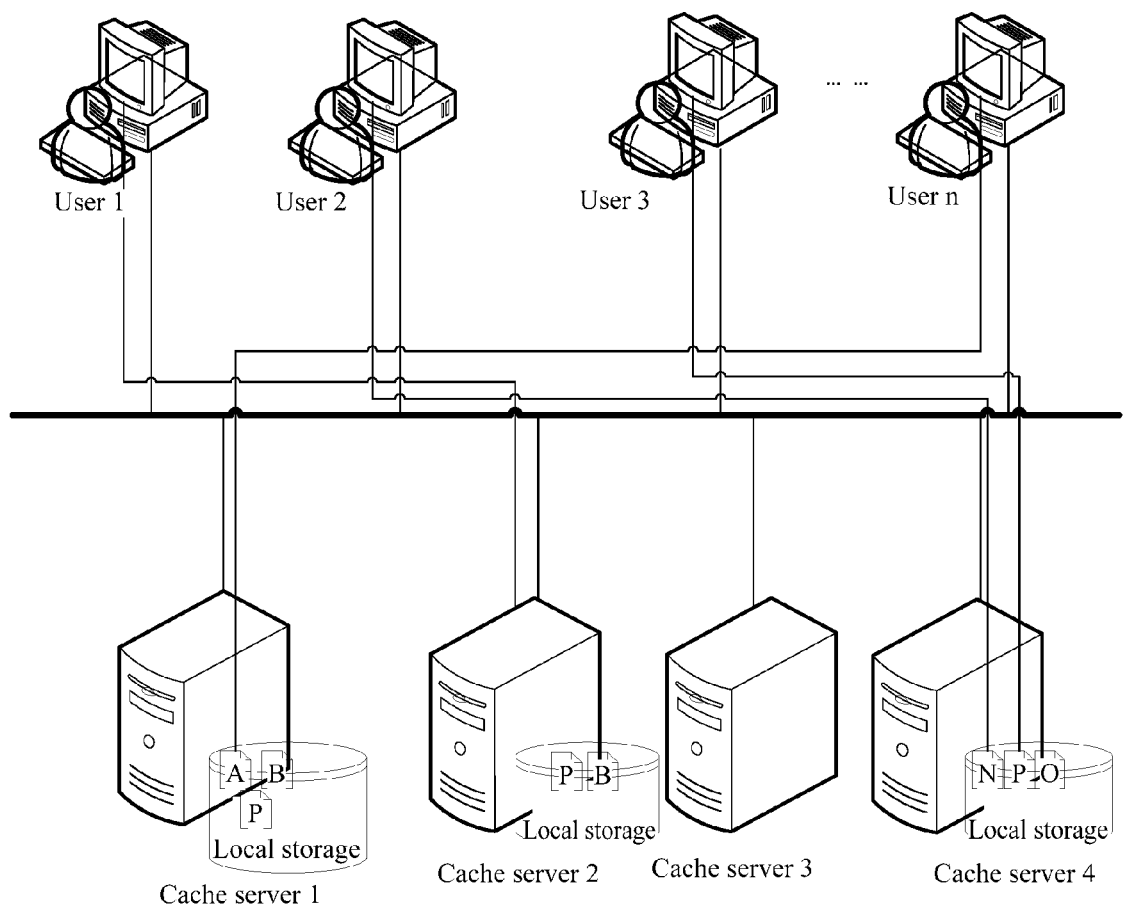
FIG. 10 is a schematic structure diagram of a P2P buffering system according to an embodiment of the present disclosure.

The following describes a resource buffering system that is a P2P buffering system in an embodiment of the present disclosure. FIG. 10 is a schematic structure diagram of a P2P buffering system according to an embodiment of the present disclosure. As shown in FIG. 10, the P2P buffer system includes: user 1, user 2, . . . , user n, cache server 1, cache server 2, cache server 3, and cache server 4.

As described above, the scheduling server 92 determines that resource P stored in cache server 4 is a popular resource, calculates the access popularity value of resource P, and decides to send two duplicates of resource P to two cache servers 94 (namely, cache server 1 and cache server 2). Preferably, the duplicates are sent to the idle cache server 94. The scheduling server 92 sends an instruction, which instructs cache server 1 and cache server 2 to duplicate resource P to a locally directory. Upon completion of duplication, cache server 1 and cache server 2 notify the scheduling server 92 in the mode of notifying the database, and indicate to the scheduling server 92 which servers provide the buffered resource for the user. Afterward, the scheduling server 92 can schedule cache server 1, cache server 2, cache server 3, and cache server 4 that store this resource to serve the user according to a scheduling algorithm. When the popularity value changes to the threshold value, the scheduling server subtracts a proper number of duplicates of the popular files according to the state of cache server 1, cache server 2, and cache server 4 to avoid resource waste.

The local disk is used for storage, and the scheduling server 92 calculates and counts the popular resources, and controls the destination of sending the duplicates. All the cache servers 94 that include the same popular resource are accessible to the user, which meets the requirements of the applications characterized by large numbers of users in the P2P buffering system, especially the scenarios with many popular resources.

Figure 11:
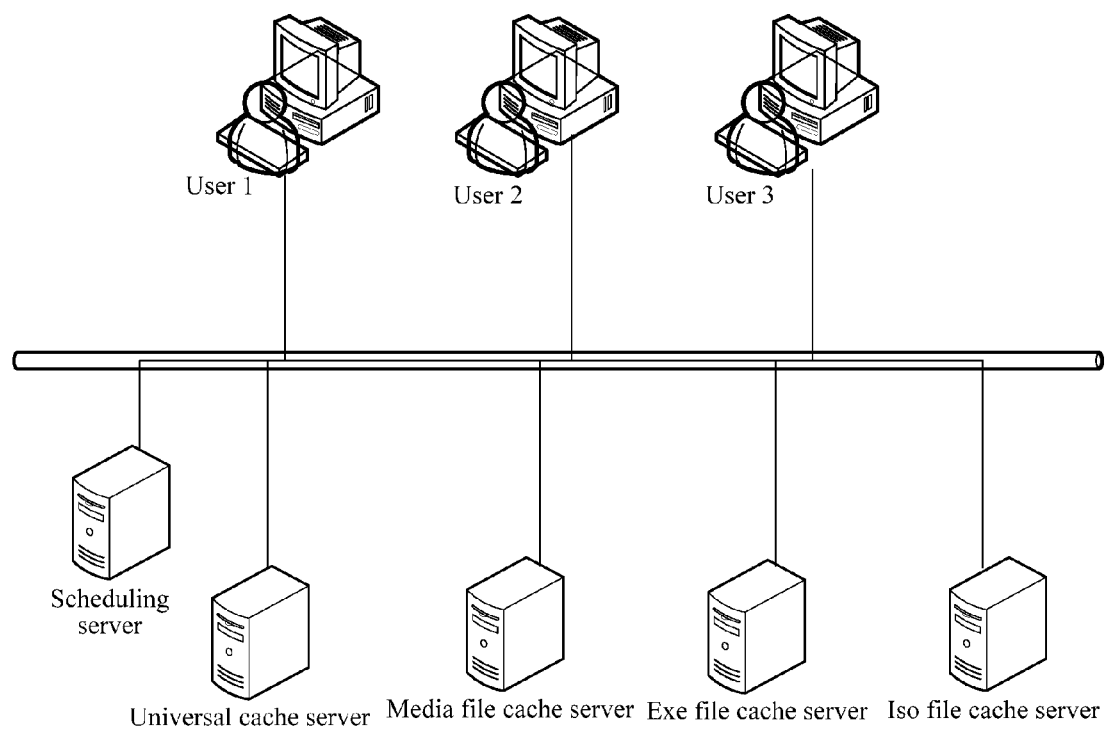
FIG. 11 is a schematic structure diagram of a system that provides classified storage of resources according to an embodiment of the present disclosure.

FIG. 11 is a schematic structure diagram of a system that provides classified storage of resources according to an embodiment of the present disclosure. As shown in FIG. 11, the system includes user 1, user 2, user 3, a scheduling server, a universal cache server, a media resource cache server, and Exe resource cache server, and an Iso resource cache server.

The scheduling server duplicates the popular files in the universal server through a popularity scheduling algorithm, and sends the duplicates to optimized dedicated cache servers of different performance according to file types. The dedicated cache servers provide high-performance data transmission for users. Therefore, servers of different performance are made full use of, and the performance of the entire buffering system is improved.

The foregoing system architecture fulfills the objectives of extending an existing system, making full use of servers of different performance, and saves the cost on the whole.

The apparatus embodiment above is illustrative in nature. The units described as stand-alone components above may be physically separated or not; and the components illustrated as units may be physical units or not, namely, they may be located in one place, or distributed on multiple network elements. Some or all of the modules described above may be selected as required to fulfill the objectives of the technical solution of the present disclosure, which can be understood and implemented by those skilled in the art without any creative effort.

The units and the calculation steps of examples described in the embodiments of the present disclosure may be implemented by electronic hardware, or computer software, or both of them. To clarify the interchangeability between hardware and software, the foregoing text has generically described the composition of the exemplary hardware and the steps of the exemplary software according to functions. As regards whether the functions are implemented by hardware or software, it depends on the specific application of the technical solution and the constraint conditions of the design. Those skilled in the art can use different methods to implement the described functions for each specific application, but such implementation shall not be regarded as falling outside the scope of the embodiments of the present disclosure in any way.

In conclusion, by virtue of the technical solution of the present disclosure, the mechanism of judging popular resources is applied in the buffering system, and the popular resource is duplicated into multiple cache servers. Therefore, the access load is shared between the servers. A scheduling server implements scheduling between the cache servers, and multiple cache servers provide services jointly. Therefore, the extensibility of the buffering system and the efficiency of downloading resources are improved. When one or more cache servers fail, the service of accessing the popular resources is still available to the user without interruption. Because multiple cache servers provide services jointly, the egress bandwidth pressure is relieved, the abrupt rise of the egress bandwidth pressure is prevented, and the usage of the cache server is improved to the utmost. The mechanism of recycling the popular resources improves usage of the storage space, and prevents waste of the storage space. The resource buffering system implements load sharing and automatic cleanup of the storage space.

Finally, it should be noted that the above embodiments are merely provided for describing the technical solutions of the present disclosure, but not intended to limit the present disclosure. It is apparent that persons skilled in the art can make various modifications and variations to the disclosure without departing from the spirit and scope of the disclosure. The present disclosure is intended to cover the modifications and variations provided that they fall in the scope of protection defined by the following claims or their equivalents.

What is claimed is:

1. A resource buffering method implemented by a hardware processor of a resource buffering apparatus, the method comprising:
   obtaining an access popularity value of a resource, and obtaining first load values of cache servers when determining that the access popularity value reaches a preset first threshold; and
   determining one or more duplication cache servers from the cache servers for duplicating the resource according to the access popularity value and the first load values, and notifying the one or more duplication cache servers to duplicate the resource from a first cache server that stores the resource;
   when the access popularity value of the resource is lower than the first threshold, determining a second cache server among the cache servers that already buffers the resource according to second load values of all cache servers that buffer the resource and a required quantity of duplicates of the resource, and notifying the determined second cache server to delete the resource; wherein the determined second cache server has a load higher than other cache servers that already buffer the resource.

2. The method according to claim 1, further comprising:
   obtaining a duplication completion notification sent by the one or more duplication cache servers; and
   writing the duplication completion notification and duplication information into a database, wherein the duplication information is of the one or more duplication cache servers that buffer the resource.

3. The method according to claim 1, further comprising:
   determining a level of a quantity of downloads of the resource in a time period according to the access popularity value;
   sorting all cache servers except the first cache server that already buffers the resource in order of the first load values, and obtaining a sorting result; and
   determining a required quantity of duplication cache servers according to the level of the quantity of downloads, and selecting one or more cache servers as the one or more duplication cache servers based on the sorting result and the required quantity of the duplication cache servers, wherein the one or more duplication cache servers are the cache servers whose load values are lower than a preset second threshold.

4. A resource buffering apparatus, comprising:
   a processor; and
   a memory, wherein the processor is configured to execute computer-executable instructions stored in the memory to perform operations of:
   obtaining an access popularity value of a resource, and obtaining first load values of cache servers where determining that the access popularity value reaches a preset first threshold; and
   determining one or more duplication cache servers from the cache servers for duplicating the resource according to the access popularity value and the first load values, and notifying the one or more duplication cache servers to duplicate the resource from a first cache server that stores the resource;
   when the access popularity value of the resource is lower than the first threshold, determining a second cache server among the cache servers that already buffers the resource according to second load values of all cache servers that buffer the resource and a required quantity of duplicates of the resource, and notifying the determined second cache server to delete the resource; wherein the determined second cache server has a load higher than other cache servers that already buffer the resource.

5. The resource buffering apparatus according to claim 4, wherein the processor is further configured to perform operations of:
   obtaining a duplication completion notification sent by the one or more duplication cache servers; and
   writing the duplication completion notification and duplication information into a database, wherein the duplication information is of the one or more duplication cache servers that buffer the resource.

6. The resource buffering apparatus according to claim 4, wherein the processor is further configured to perform operations of:
   determining a level of a quantity of downloads of the resource in a time period according to the access popularity value;
   sorting all cache servers except the first cache server that already buffers the resource in order of the first load values, and obtaining a sorting result; and
   determining the required number of duplication cache servers according to the level of the number of downloads, and selecting one or more cache servers as the one or more duplication cache servers in the sorting result according to the required number of the duplication cache servers, wherein the one or more duplication cache servers are the cache servers whose load value are lower than a preset second threshold.

7. A non-transitory computer readable storage medium, storing computer instructions for buffering a resource, wherein the computer instructions when executed by a hardware processor instructs the hardware processor to implement following operations:
   obtaining an access popularity value of a resource, and obtaining first load values of cache servers when determining that the access popularity value reaches a preset first threshold; and
   determining one or more duplication cache servers from the cache servers for duplicating the resource according to the access popularity value and the first load values, and notifying the one or more duplication cache servers to duplicate the resource from a first cache server that stores the resource;

when the access popularity value of the resource is lower than the first threshold, determining a second cache server among the cache servers that already buffers the resource according to second load values of all cache servers that buffer the resource and a required quantity of duplicates of the resource, and notifying the determined second cache server to delete the resource; wherein the determined second cache server has a load higher than other cache servers that already buffer the resource.

8. The non-transitory computer readable storage medium according to claim 7, wherein the operations further comprise:

obtaining a duplication completion notification sent by the one or more duplication cache servers; and writing the duplication completion notification and duplication information into a database, wherein the duplication information is of the one or more duplication cache servers that buffer the resource.

9. The non-transitory computer readable storage medium according to claim 7, wherein the operations further comprise:

determining a level of a quantity of downloads of the resource in a time period according to the access popularity value;

sorting all cache servers except the first cache server that already buffers the resource in order of the first load values, and obtaining a sorting result; and determining a required quantity of duplication cache servers according to the level of the quantity of downloads, and selecting one or more cache servers as the one or more duplication cache servers based on the sorting result and the required quantity of the duplication cache servers, wherein the one or more duplication cache servers are the cache servers whose load values are lower than a preset second threshold.

* * * * *